(12) United States Patent
Eddings, II et al.

(10) Patent No.: US 7,890,966 B2
(45) Date of Patent: Feb. 15, 2011

(54) DISK DRIVE ACCESS DOOR

(75) Inventors: Richard Eddings, II, Ceder Park, TX (US); Jason A. Shepherd, Austin, TX (US); Kevin M. Bailey, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 797 days.

(21) Appl. No.: 11/836,847

(22) Filed: Aug. 10, 2007

(65) Prior Publication Data

US 2009/0044211 A1    Feb. 12, 2009

(51) Int. Cl.
*G11B 17/04* (2006.01)
*G11B 33/02* (2006.01)

(52) U.S. Cl. ...................................... 720/647
(58) Field of Classification Search ............ 361/679.33, 361/724; 312/223.1, 223.2; 720/647
See application file for complete search history.

(56) References Cited

U.S. PATENT DOCUMENTS

| | | | |
|---|---|---|---|
| 6,243,347 B1 * | 6/2001 | Kawana et al. ............ | 720/646 |
| 6,317,316 B1 | 11/2001 | Bentley et al. | |
| 6,545,966 B1 * | 4/2003 | Lin ........................... | 720/609 |
| 6,621,691 B2 | 9/2003 | Howell | |
| 6,654,251 B2 * | 11/2003 | Yun .......................... | 361/724 |
| 6,711,112 B2 * | 3/2004 | Lin ........................... | 720/609 |
| 6,816,448 B2 * | 11/2004 | Lee .......................... | 369/75.11 |
| 6,891,720 B2 * | 5/2005 | Voon et al. ............. | 361/679.31 |
| 7,055,160 B1 | 5/2006 | Tan et al. | |
| 2003/0016612 A1 * | 1/2003 | Lin ........................... | 369/75.1 |
| 2003/0026072 A1 | 2/2003 | Hrehor, Jr. et al. | |
| 2006/0195852 A1 * | 8/2006 | Shimizu et al. ............. | 720/647 |
| 2006/0267466 A1 | 11/2006 | Marroquin et al. | |
| 2007/0025095 A1 | 2/2007 | Beall et al. | |

FOREIGN PATENT DOCUMENTS

| | | | | |
|---|---|---|---|---|
| JP | 61134958 A | * | 6/1986 | |
| JP | 01032455 A | * | 2/1989 | |
| JP | 2001236774 A | * | 8/2001 | |
| JP | 2003173604 A | * | 6/2003 | |

* cited by examiner

*Primary Examiner*—William J Klimowicz
(74) *Attorney, Agent, or Firm*—Larson Newman & Abel, LLP (57) ABSTRACT

An information management system is disclosed and can include a housing that can have a front panel assembly. The front panel assembly can have a frame formed with an opening and a door adjacent to the opening. Further, the system can include a disk drive within the housing. The disk drive can include an open/close button and a disk drive tray that can movable between a retracted position and an extended position. The door of the front panel assembly can be movable between a closed position in which the disk drive is not accessible, an ejection position in which the open/close button is pressed, and an open position in which the disk drive is accessible and the disk drive tray is in the extended position through the opening.

5 Claims, 8 Drawing Sheets

DISK DRIVE ACCESS DOOR

FIELD OF THE DISCLOSURE

The present disclosure relates generally to information handling systems. More specifically, the present disclosure relates to accessing one or more disk drives within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can include a housing in which one or more disk drives can be installed. Each disk drive may need to be accessed in order to load media into or eject media from the disk drive. Oftentimes, the access doors are cumbersome or not very intuitive and the user experience can suffer.

Accordingly, there is a need for an improved disk drive door for access one or more disk drives within an information handling systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

An information management system is disclosed and can include a housing that can have a front panel assembly. The front panel assembly can have a frame formed with an opening and a door adjacent to the opening. Further, the system can include a disk drive within the housing. The disk drive can include an open/close button and a disk drive tray that can movable between a retracted position and an extended position. The door of the front panel assembly can be movable between a closed position in which the disk drive is not accessible, an ejection position in which the open/close button is pressed, and an open position in which the disk drive is accessible and the disk drive tray is in the extended position through the opening.

In another embodiment, a front panel assembly for a disk drive assembly is disclosed and can include a frame formed with an opening and a door adjacent to the opening. The door can be moved between a closed position in which a disk drive is not accessible, an ejection position in which an open/close button on the disk drive is pressed, and an open position in which the disk drive is accessible.

In yet another embodiment, a disk drive assembly is disclosed and can include a housing that can have a door and a disk drive within the housing. The door can be moved between a closed position in which the door is substantially vertical, an ejection position in which the door is rotated into the housing, and an open position in which the door is substantially horizontal.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on dynamically changing file types within a distributed file systems. While the teachings may certainly be utilized in this application, the teachings may also be utilized in other applications and with several different types of architectures such as distributed computing architectures, client/server architectures, or middleware server architectures.

Figure 1:
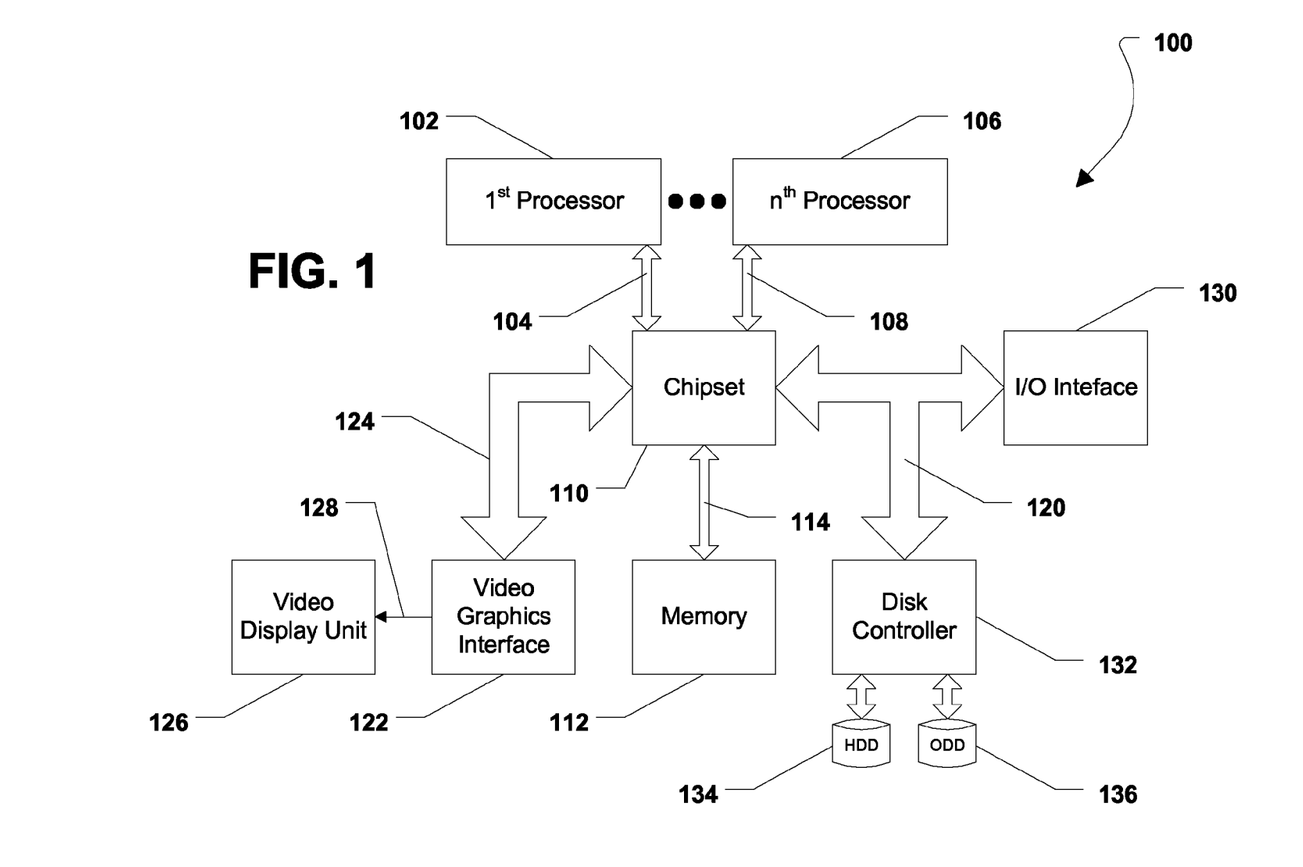
FIG. 1 is a general diagram illustrating an information handling system.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can include an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can provide at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to provide content to display within a video display unit 126. Other graphics interfaces may also be used. The video graphics interface 122 can provide a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connected to an I/O interface 130 and one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Figure 2:
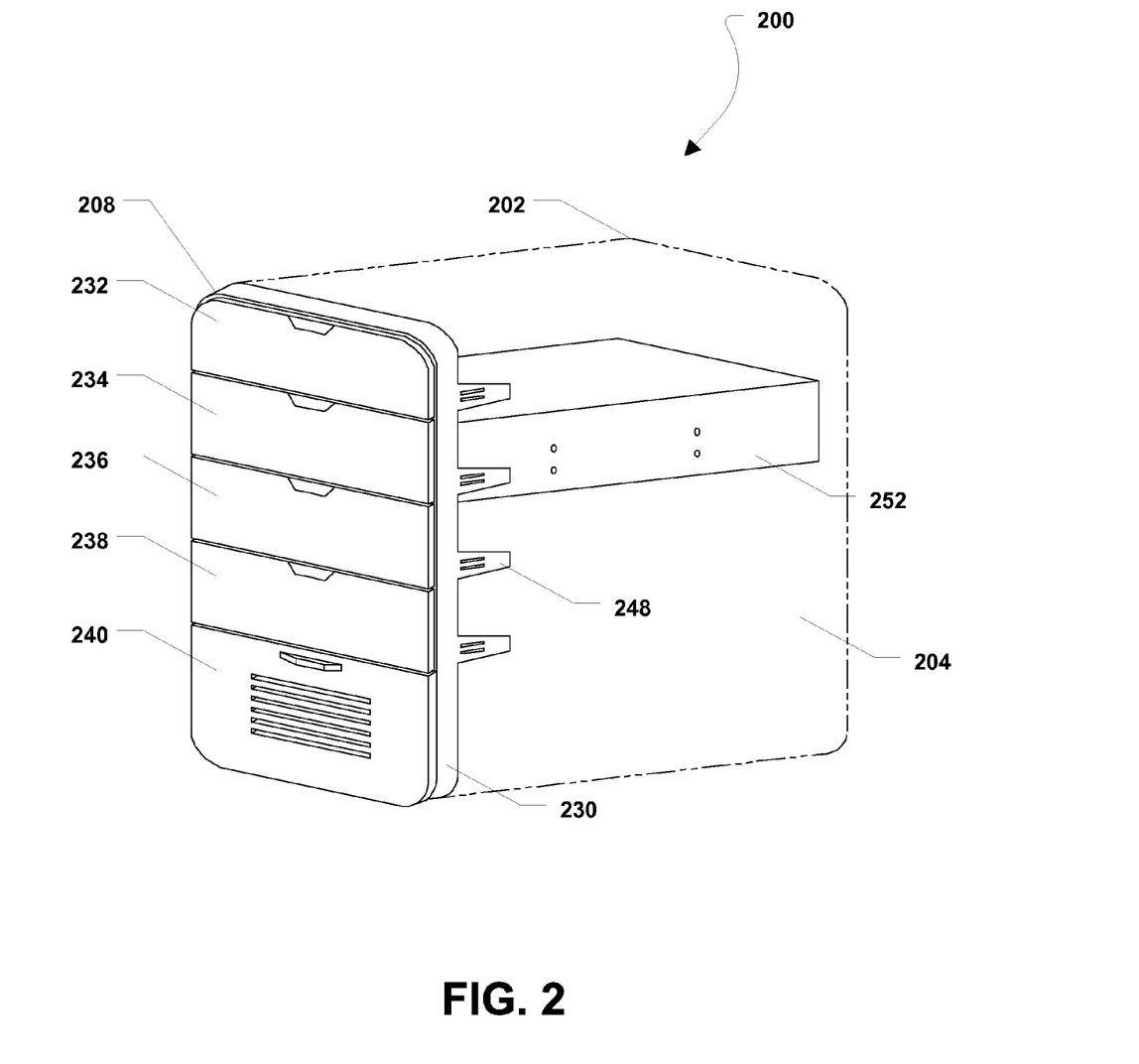
FIG. 2 is a perspective view of a disk drive housing.
Figure 3:
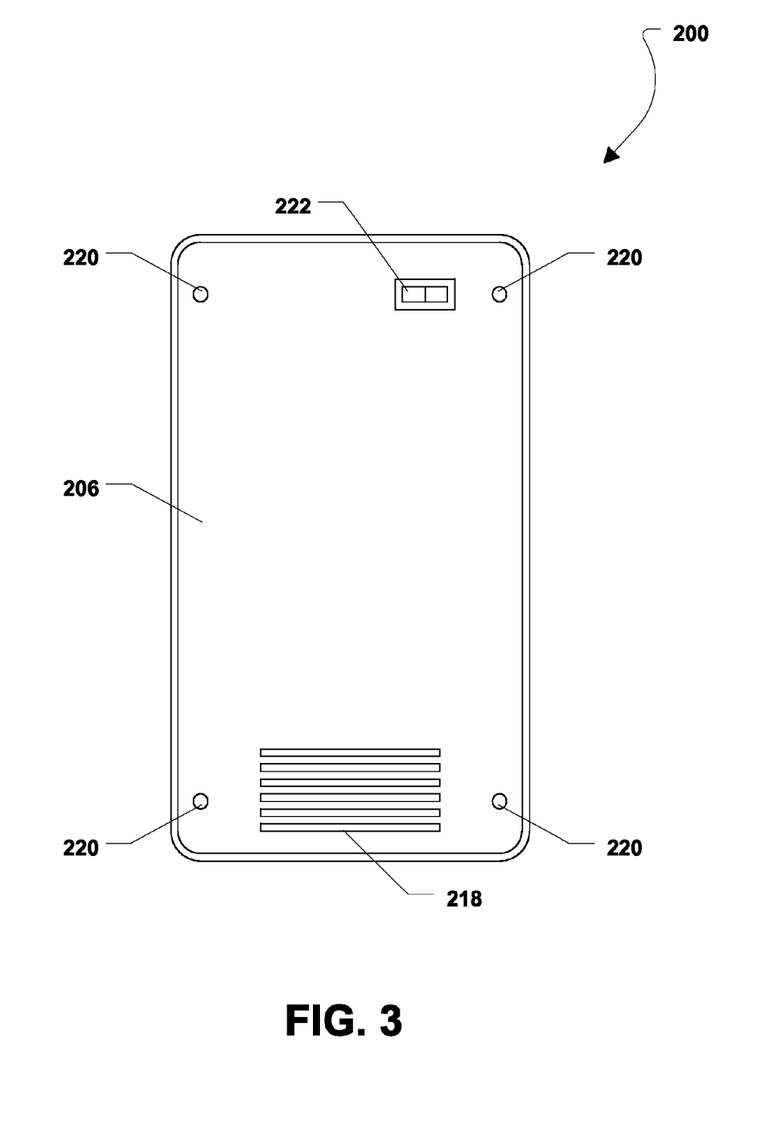
FIG. 3 is a rear plan view of a disk drive housing.
Figure 4:
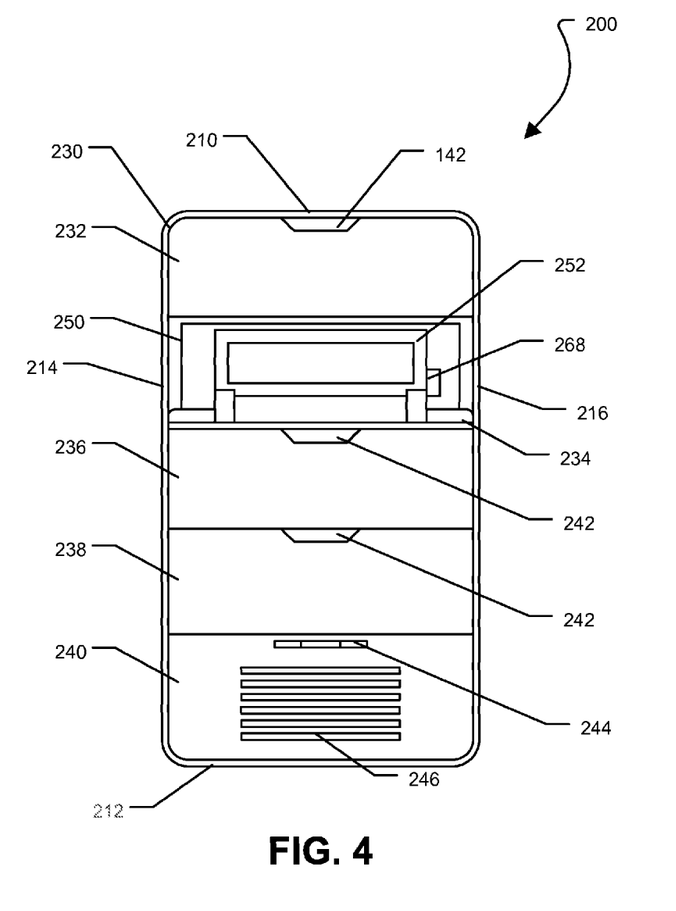
FIG. 4 is a front plan view of a disk drive housing.

Referring to FIG. 2 through FIG. 4, a disk drive assembly is shown and is generally designated 200. As shown, the disk drive assembly 200 can include a housing 202 having a body 204, a rear panel 206, and a front panel assembly 208. The body 204 can include a top 210, a bottom 212, a left side 214, and a right side 216. The rear panel 206 can include one or more vents 218. Alternatively, the rear panel 206 can be solid, that is not vented. As shown in FIG. 3, the rear panel 206 can be attached to the body 204 using one or more threaded fasteners 220, e.g., screws. Moreover, as illustrated a power switch 222 can be incorporated into the rear panel 206.

As shown in FIG. 4, the front panel assembly 208 can include a frame 230. A first disk drive door 232 can be disposed within the frame 230. A second disk drive door 234 can be disposed within the frame 230 below the first disk drive door 232. Further, a third disk drive door 236 can be disposed within the frame 230 below the second disk drive door 234. A fourth disk drive door 238 can also be disposed within the frame 230 below the third disk drive 236. Further, the front panel assembly 208 can include a vented access door 240 below the fourth disk drive door 238.

Each disk drive door 232, 234, 236, 238 can be substantially identical and can include a handle 242. The vented access door 240 can also include a handle 244. Moreover, the vented access door 240 can be formed with one or more slots 246. The slots 246 in the vented access door 240 can allow fluid, e.g., air, to flow into the interior of housing 202.

As shown in FIG. 2, the frame 230 of the front panel assembly 208 can include a plurality of locking tabs 248 that can extend into the housing 202 and engage the front panel assembly 208 with the housing 202. Further, in a particular embodiment, the frame 230 of the front panel assembly 208 can be formed with a plurality of openings 250. Each opening 250 can be substantially aligned with a respective disk drive door 232, 234, 236, 238. Each opening 250 can provide access to a disk drive 252 installed within the housing 202 when the adjacent disk drive door 232, 234, 236, 238 is opened, as shown in FIG. 4.

Referring now to FIG. 5 through FIG. 8, details concerning the front panel assembly 208 can be seen. As shown, the frame 230 of the front panel assembly 208 can include a front 254 and a back 256. FIG. 5 through FIG. 8 illustrate a portion of the front panel assembly 208 around the second disk drive door 234. As shown, a first actuator arm 260 can be attached to the frame 230 adjacent to, or along, a side of the opening 250. The first actuator arm 260 can include a proximal end 262 and a distal end 264. The proximal end 262 of the first actuator arm 260 can be affixed to the back 256 of the frame 230 via a single fastener 266, e.g., a threaded fastener. As such, the first actuator arm 260 is cantilevered and the first actuator arm 260 can be bent, as described herein, such that the distal end 264 of the first actuator arm 260 is distanced from the back 256 of the frame 230.

Figure 6:
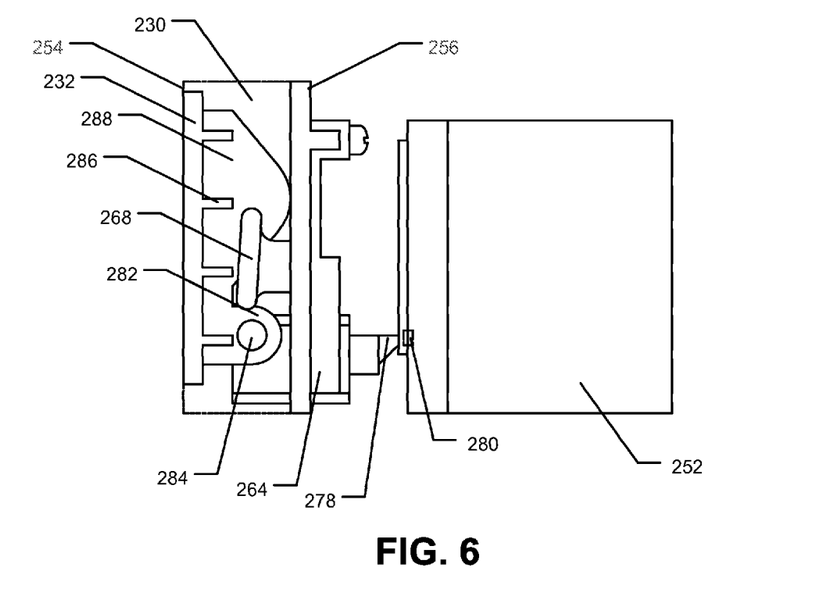
FIG. 6 is a side plan view of a portion of the front panel assembly with a disk drive door in a closed position.
Figure 7:
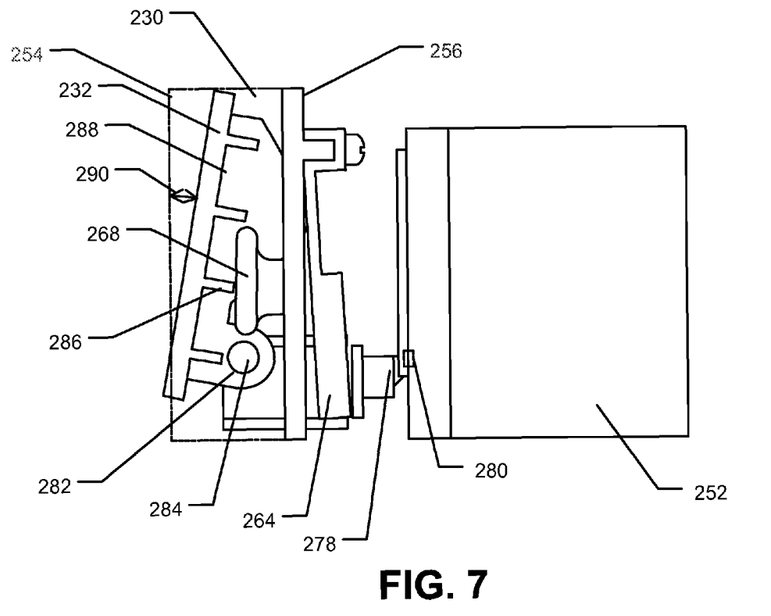
FIG. 7 is a side plan view of a portion of the front panel assembly with a disk drive door in an ejection position.
Figure 8:
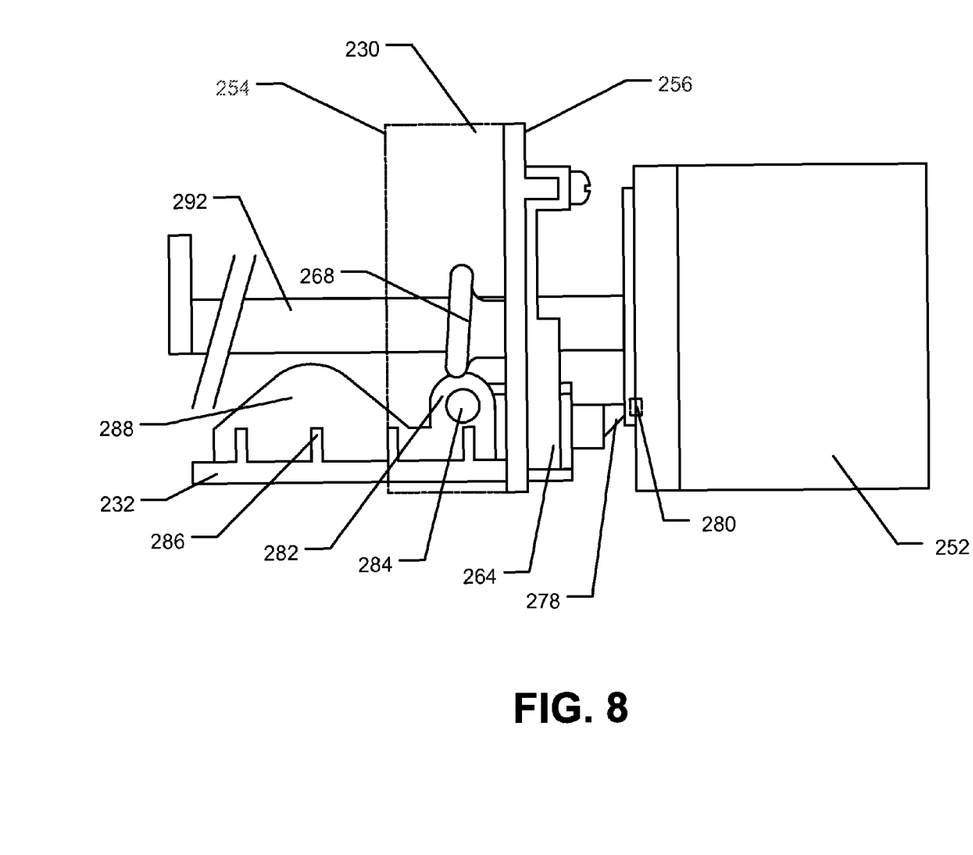
FIG. 8 is a side plan view of a portion of the front panel assembly with a disk drive door in an open position.

As shown in FIG. 6 through FIG. 8, the first actuator arm 260 can include a door engagement structure 268 between the proximal end 262 of the first actuator arm 260 and the distal end 264 of the first actuator arm 260. The door engagement structure 268 can extend from the first actuator arm 260 toward the front 254 of the frame 230.

Figure 5:
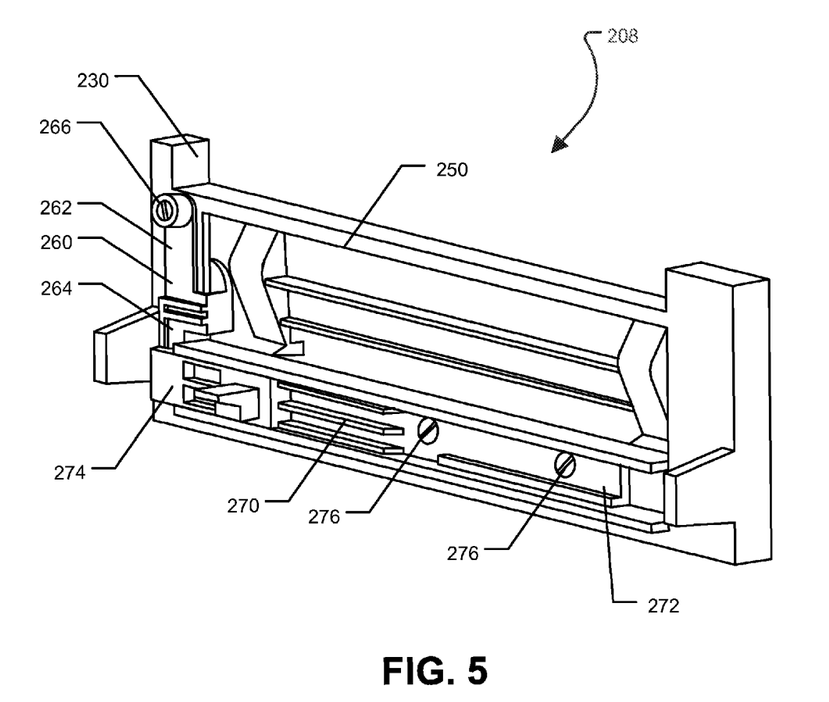
FIG. 5 is a perspective view of a portion of a front panel assembly associated with the disk drive housing.

The front panel assembly 208 can include a second actuator arm 270 installed on the back 256 of the frame 230 adjacent to, or along, a bottom of the opening 250. The second actuator arm 270 can include a proximal end 272 and a distal end 274. The proximal end 272 of the second actuator arm 270 can be affixed to the frame 230 by a pair of fasteners 276 installed at, or near, the proximal end 272 of the second actuator arm 270. As such, the second actuator arm 270 is cantilevered and the second actuator arm 270 can be bent, as described herein, such that the distal end 274 of the second actuator arm 270 is distanced from the back 256 of the frame 230.

As illustrated in FIG. 6 through FIG. 8, the second actuator arm 270 can include a disk drive engagement structure 278 between the proximal end 272 of the second actuator arm 270 and the distal end 274 of the second actuator arm 270 near the distal end 274 of the second actuator arm 270. The disk drive engagement structure 278 can extend from the second actuator arm 270 into the interior of the housing 202. In a particular embodiment, the disk drive engagement structure 278 can selectively engage, and toggle, an open/close button 280 on the disk drive 252.

FIG. 6 through FIG. 8 show that the second disk drive door 234 can include at least one collar 282 that can engage and rotate around a post 284 extending from the frame 230. The second disk drive door 234 can also include a plurality of ribs 286 that extend at least partially along the interior of the second disk drive door 234. The ribs 286 can provide stiffness for the second disk drive door 234. The second disk drive door 234 can also include a plurality of disk drive tray engagement structures 288 that extend from the second disk drive door 234 toward the interior of the housing 202.

In a particular embodiment, the second disk drive door 234 is movable between a closed position, an ejection position, and an open position. As shown in FIG. 6, in the closed position, the second disk drive door 234 can be substantially vertical and parallel to the frame 230 of the front panel assembly 208. Further, in the closed position the second disk drive door 234 can be disposed within the frame of the front panel assembly 208 adjacent to an opening 250. Also, in the closed position, the second disk drive door 234 can be substantially flush with the front 254 of the frame 230.

In the ejection position, shown in FIG. 7, the second disk drive door 234 can be rotated about the post 284 so that the second disk drive door 234 forms an ejection angle 290 with respect to the frame 230. In a particular embodiment, the ejection angle 290 is in a range of five degrees to fifteen degrees (5°-15°). In another embodiment, the ejection angle 290 is in a range of six degrees to fourteen degrees (6°-14°). In yet another embodiment, the ejection angle 290 is in a range of seven degrees to thirteen degrees (7°-13°). In still another embodiment, the ejection angle 290 is in a range of eight degrees to twelve degrees (8°-12°). In another embodiment, the ejection angle 290 is in a range of nine degrees to eleven degrees (9°-11°). In yet still another embodiment, the ejection angle 290 is approximately ten degrees (10°).

In the ejection position, at least one of the ribs 286 on the second disk drive door 234 can engage the door engagement structure 268 on the first actuator arm 260 and push the distal end 264 of the first actuator arm 260 away from the frame 230 so that the distal end 264 of the first actuator arm 260 is distanced from the frame 230. Further, in the ejection position, as the distal end 264 of the first actuator arm 260 moves away from the frame 230, the distal end 264 of the first actuator arm 260 can engage the distal end 274 of the second actuator arm 270 and bend the second actuator arm 270 so that the distal end 274 of the second actuator arm 270 moves in a direction away from the frame 230 and toward the disk drive 252. As the distal end 274 of the second actuator arm 270 moves toward the disk drive 252, the disk drive engagement structure 278 on the second actuator arm 270 can press the open/close button 280 on the disk drive 252.

After the second disk drive door 234 causes the open/close button 280 to be pressed, a disk drive tray 292 within the disk drive 252 can move from a retracted position to an extended position, shown in FIG. 8. As the disk drive tray 292 moves to the extended position, the disk drive tray 292 can engage and push the disk drive tray engagement structures 288 that extend from the second disk drive door 234. Also, the disk drive tray 292 can rotate the second disk drive door 234 from the ejection position to the open position. In the open position, shown in FIG. 8, the second disk drive door 234 can be substantially horizontal and perpendicular to the frame 130.

In order to return the disk drive tray 292 to the retracted position, a user can simply press the door engagement structure 268, which acts like a button. Pressing the door engagement structure 268 will cause the disk drive engagement structure 278 on the second actuator arm 270 to press the open/close button 280, as described above.

It can be appreciated, that the front panel assembly 208 can be configured and operate, as shown in FIG. 5 through FIG. 8, in the area adjacent to each of the disk drive doors 232, 234, 236, 238.

With the configuration of structure described herein, embodiments described herein can allow a user to intuitively access a disk drive within a disk drive housing. A user can simply push a door on the housing. The door is adjacent to a disk drive and the door can cause an open/close button on the disk to be pressed. Once the button is pressed, a disk drive tray can move from a retracted position within the disk drive to an extended position. As the disk drive tray moves to the extended position, the disk drive tray can move the door into an open position to allow access to the disk drive tray. As described herein, the entire door can act as a disk drive eject button. The door can prove a large, easily accessible surface for drive ejection. As such, during low light conditions, a user will be able to relatively easily access a disk drive. Further, the need for a separate eject button on the housing exterior is eliminated.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information management system, comprising:
  a housing having a front panel assembly having a frame formed with an opening and a door adjacent to the opening; and
  a disk drive within the housing, wherein the disk drive includes an open/close button and a disk drive tray movable between a retracted position and an extended position;
  wherein the door is movable between a closed position in which the disk drive is not accessible, an ejection position in which the open/close button is pressed, and an open position in which the disk drive is accessible and the disk drive tray is in the extended position through the opening;

wherein the front panel assembly further comprises a first actuator arm installed along a side of the opening on a back of the frame;

wherein the first actuator arm comprises a proximal end connected to the back of the frame and a distal end configured to move relative to the frame;

wherein the first actuator arm further comprises a door engagement structure that extends from the first actuator arm toward a front of the frame;

wherein the front panel assembly further comprises a second actuator arm installed along a bottom of the opening on the back of the frame;

wherein the second actuator arm comprises a proximal end connected to the back of the frame and a distal end configured to move relative to the frame;

wherein the second actuator arm further comprises a disk drive engagement structure that extends from the second actuator arm toward the disk drive;

wherein in the closed position, the door is substantially parallel to the frame; and wherein in the ejection position, the door is angled with respect to the frame, the door pushes the door engagement structure, the distal end of the first actuator arm is distanced from the frame, the distal end of the first actuator arm pushes the second actuator arm, the distal end of the second actuator arm moves toward the disk drive, and the disk drive engagement structure pushes the open/close button.

2. The information management system of claim 1, wherein as the disk drive tray moves to the extended position, the disk drive tray pushes the door into the open position.

3. The information management system of claim 2, wherein in the open position, the door is substantially perpendicular to the frame.

4. A front panel assembly for a disk drive assembly, comprising:

a frame formed with an opening;

a door adjacent to the opening, wherein the door is movable between a closed position in which a disk drive is not accessible, an ejection position in which an open/close button on the disk drive is pressed, and an open position in which the disk drive is accessible;

a first actuator arm installed along a side of the opening on a back of the frame, wherein the first actuator arm comprises a proximal end connected to the back of the frame, a distal end configured to move relative to the frame, and a door engagement structure that extends from the first actuator arm toward a front of the frame; and a second actuator arm installed along a bottom of the opening on the back of the frame, wherein the second actuator arm comprises a proximal end connected to the back of the frame, a distal end configured to move relative to the frame, and a disk drive engagement structure that extends from the second actuator arm away from the frame, wherein in the ejection position, the door is angled with respect to the frame, the door pushes the door engagement structure, and the distal end of the first actuator arm is distanced from the frame.

5. The front panel assembly of claim 4, wherein in the ejection position, the distal end of the first actuator arm pushes the second actuator arm, the distal end of the second actuator arm moves toward the disk drive, and the disk drive engagement structure pushes the open/close button.

* * * * *